Patented Jan. 27, 1931

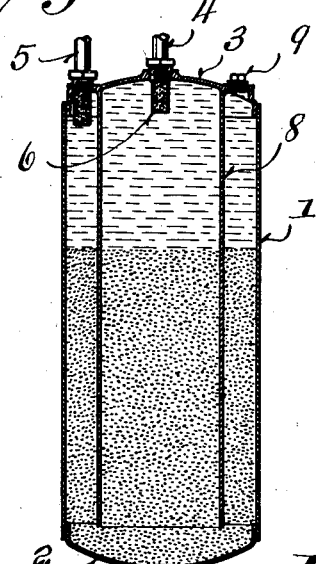
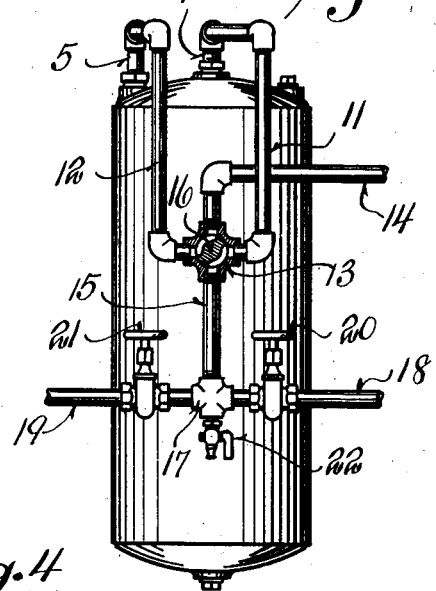
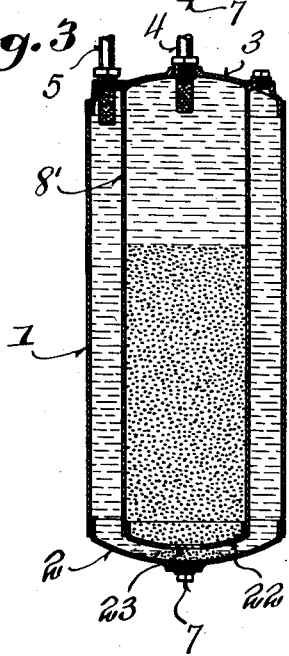
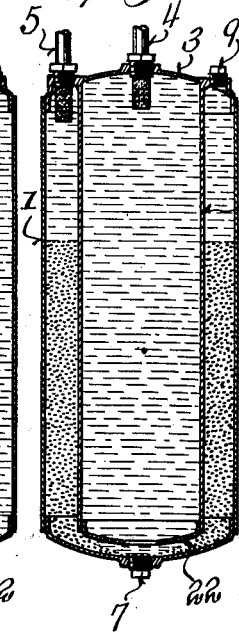
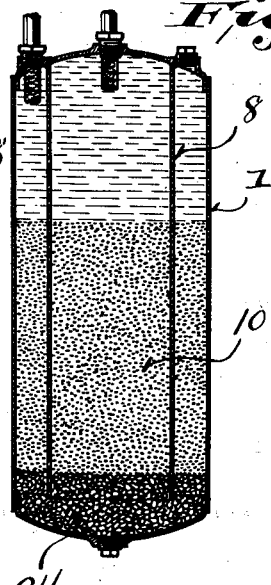

1,789,961

UNITED STATES PATENT OFFICE

JOHN ASTROM, OF FORT WAYNE, INDIANA, ASSIGNOR OF ONE-HALF TO DEISTER MACHINE COMPANY, OF FORT WAYNE, INDIANA, A CORPORATION

APPARATUS FOR TREATING LIQUIDS

Application filed November 4, 1927. Serial No. 231,034.

This invention relates to apparatus for treating liquids.

This invention is an improvement over that disclosed in my co-pending application, Serial No. 153,885, filed December 10, 1926, for apparatus for treating liquids.

Objects of this invention are to provide an apparatus for treating liquids, such for instance, as a water softener which is so constructed that no screens are required for supporting the active material, but instead in which the material is supported directly by the bottom of the water softener itself, and in which the height of the softening or active material is materially less than that heretofore required, so that packing of the softening material is very much reduced and due to the fact that no screens are employed clogging is prevented as well as the channelling usually resulting from the use of screens.

Further objects are to provide a novel form of water softener in which the active material is shifted or very thoroughly agitated by the flow of water so that it may be readily freed from adhering materials and also so that the excess brine may be readily washed out.

A further object is to provide a water softener which is so constructed that reverse flow of the water both in washing and in the regular operation of the device may be most easily obtained, and in which the water always leaves the active material at its highest point, irrespective of the direction of flow of the water.

A further object is to provide a water softener in which there is one main tank within which an auxiliary tank or compartment is formed, such auxiliary tank being permanently joined to the top of the main tank so that the top portion of each of the two compartments into which the main tank is divided, are not in communication with each other and in which the bottoms only of the two compartments are in communication.

Embodiments of the invention are shown in the accompanying drawings in which:—

Figure 1 is a vertical sectional view through one form of the apparatus;

Figure 2 is an elevation with parts in section of the structure shown in Figure 1;

Figure 3 is a modified form of the invention which shows the active material completely shifted from one compartment to the other;

Figure 4 is a view similar to Figure 3 except showing the active material shifted to the outer compartment;

Figure 5 is a modified form of the invention.

Referring to Figures 1 and 2, it will be seen that the water softener comprises a main tank 1 having a bottom 2 and a top 3. The top is provided with a pair of outlets 4 and 5 which may be provided with any suitable terminal screens or other portions indicated by the reference character 6. The bottom 2 is provided with a drain plug 7.

Within the main compartment or tank 1, an auxiliary tank or inner compartment 8 is positioned and is rigidly secured to the top, so that the main tank is divided into two compartments communicating only at their bottom, and it will be noted from Figure 1 that the auxiliary tank or compartment 8 stops short of the bottom 2 of the main tank. One or the other of the compartments may be provided with a plug 9 through which the salt may be inserted. For instance, as shown in Figure 1, the plug 9 communicates with the outer compartment.

The apparatus is filled with active material indicated by the reference character 10. This may be of the sodium bass mineral type. The active materials may extend upwardly to any desired height. In the form shown, approximately two-thirds of the available space has been used.

It is to be noted that there are no screens whatsoever employed in this construction and that the active material is supported solely by the base 2 of the device.

Referring to Figure 2, it will be seen that the outlets 4 and 5 communicate by way of pipes 11 and 12 with a valve 13. This valve is also in communication with pipes 14 and 15. The valve is provided with a rotary member or oscillatory member 16 which may be rotated to place either the pipes 14 and 12 and the pipes 11 and 15 in communication, or vice versa, the first arrangement being shown in Figure 2. The pipe 15 extends downwardly to a fitting 17 which communicates with two pipes 18 and 19 controlled by the hand valves 20 and 21. If desired, a testing cock 22 may be carried by the fitting 17. One of the pipes 18, for instance, goes to the house supply and the other pipe 19 goes to the sewer. The pipe 14 is the raw water supply pipe.

In using the apparatus it is apparent that the incoming water may enter by means of either the pipes 11 or 12 and may pass outwardly by means of the pipe 18. In addition to this, after the water has flowed in one direction during the normal operation of the device it may be found desirable to reverse the flow of the water and present the untreated water first to the other portion of the water softening material.

In rejuvenating or revivifying the material, the plug 9 is removed and the salt is inserted. Thereafter, the brine may be allowed to either soak through the material or to be slowly forced therethrough by proper adjustment of the valves. After the requisite time has elapsed, the valve 13 is manipulated to cause the flow into one or the other of the two compartments, the valve 20 being closed and the sewer valve or discharge valve 21 being opened. This washing is most fully accomplished by reversing the flow after a given length of time by shifting the valve 13.

It is apparent that during this washing operation the mineral is thoroughly agitated and is shifted from one compartment to the other in a greater or less degree, depending upon the rate of flow of the water. This shifting of the material and agitation thereof causes it to become thoroughly cleansed of all impurities and also insures the complete discharge of all of the salt solution during the washing operation. After the washing operation has been completed the valve 21 is closed and the valve 20 opened.

In the form shown in Figures 3 and 4, the device has the same construction as that previously described except that the inner tank 8' is also provided with a bottom 22 perforated, as indicated at 23, and spaced from the bottom 2 of the main tank 1.

In this form of the invention, as illustrated in Figures 3 and 4, the two positions for the complete shifting of the active material has been shown. In Figure 3, the active material has been shifted into the inner tank 8. In the other figure, the active material has been shown as completely shifted into the outer tank or compartment. Thus, a very thorough and complete agitation of the active material is secured, and therefore a complete freeing from excess brine and also from any impurities is obtained.

In the form shown in Figure 5, identically the same construction as that illustrated in Figure 1 is employed except that the bottom of the apparatus is filled with gravel, as indicated by the reference character 24. This gravel extends upwardly above the highest point of communication between the tank 8 and the tank 1. The active material 10 is positioned in each compartment above the gravel.

It will be noted that the gravel prevents shifting of the active material from one compartment to the other but nevertheless the active material is thoroughly agitated by the flowing stream of water.

It will be seen that a very simple, compact and a highly effective form of water softener has been provided by this invention which is easily operated, which is of attractive appearance, which may be readily installed in a restricted space, and which is easy to manufacture.

Although the invention has been described in considerable detail, such description is intended as illustrative rather than limiting as the invention may be variously embodied and as the scope of such invention is to be determined as claimed.

I claim:

1. A water softener comprising a closed vessel divided by an internal shell into two compartments, said compartments being separate and distinct at their upper ends and being in communication with each other at their lower ends, water treating means within said softener, and means for passing water in either direction through said compartments.

2. A water softener comprising a closed cylindrical vessel divided by a cylindrical shell into two concentric compartments, said compartments being separated by said shell at the upper end of said vessel and being distinct and separate at such upper ends and being in communication with each other at their lower ends, water softening material carried within said compartments and resting upon the bottom of the outer vessel, and means for passing water in either direction through said compartments.

3. A water softener comprising an outer cylindrical vessel, an inner cylindrical vessel, a head closing both of said vessels at their upper ends, a bottom closing the outer vessel at its lower end, a perforated bottom closing the inner vessel at its lower end, said bottoms being spaced apart, water treating means carried within one of said compartments, and means for passing water in either direction through the inner vessel and the space formed between the outer and inner vessels.

4. A water softener comprising a cylindrical vessel, a cylindrical shell depending from the head of said vessel and spaced from the bottom of said vessel, thus forming two compartments, said compartments being in communication with each other adjacent the bottom of said vessels, water treating means carried within one of said vessels and adapted to be shifted partly into the other of said vessels, and means for passing water in either direction through said compartments.

In testimony that I claim the foregoing I have hereunto set my hand at Fort Wayne, in the county of Allen and State of Indiana.

JOHN ASTROM.